(12) United States Patent
Shin et al.

(10) Patent No.: US 11,196,764 B2
(45) Date of Patent: Dec. 7, 2021

(54) DEVICE AND METHOD FOR HANDLING NETWORK ATTACKS IN SOFTWARE DEFINED NETWORK

(71) Applicants: Samsung Electronics Co., Ltd., Suwon-si (KR); Korea Advanced Institute of Science and Technology, Daejeon (KR)

(72) Inventors: Hyunho Shin, Suwon-si (KR); Seung Won Shin, Daejeon (KR); Seung Hyeon Lee, Daejeon (KR); Kibeom Park, Hwaseong-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 72 days.

(21) Appl. No.: 16/639,502

(22) PCT Filed: Aug. 14, 2018

(86) PCT No.: PCT/KR2018/009327
§ 371 (c)(1),
(2) Date: Feb. 14, 2020

(87) PCT Pub. No.: WO2019/035634
PCT Pub. Date: Feb. 21, 2019

(65) Prior Publication Data
US 2021/0029158 A1    Jan. 28, 2021

(30) Foreign Application Priority Data
Aug. 16, 2017   (KR) .................. 10-2017-0103737

(51) Int. Cl.
*H04L 29/06* (2006.01)

(52) U.S. Cl.
CPC ................ *H04L 63/1441* (2013.01)

(58) Field of Classification Search
CPC ............ H04L 63/1441; H04L 63/1408; H04L 63/1416; H04L 63/1425; H04L 63/1433;
(Continued)

(56) References Cited

U.S. PATENT DOCUMENTS

| 7,725,587 B1 * | 5/2010 | Jacoby | H04L 63/1416 709/229 |
| 9,894,311 B2 * | 2/2018 | Claus | H04N 5/44 |

(Continued)

FOREIGN PATENT DOCUMENTS

| JP | 2015-091106 A | 5/2015 |
| JP | 2017-511072 A | 4/2017 |

(Continued)

OTHER PUBLICATIONS

ISA/KR, International Search Report and Written Opinion of the International Searching Authority, International Application No. PCT/KR2018/009327, dated Nov. 26, 2018, 13 pages.
(Continued)

*Primary Examiner* — Ali S Abyaneh

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present disclosure provides an apparatus and a method for handling a network attack in a software defined network (SDN). The method for handling a network attack in an SDN according to various embodiments of the present disclosure includes detecting a first candidate of the network attack in a flow during a first time interval, in response to detecting the first candidate, changing quality of service (QoS) of the flow from first QoS to second QoS, detecting a second
(Continued)

candidate of the network attack in the flow of the second QoS during a second time interval following the first time interval, and in response to detecting the second candidate, blocking the flow. The apparatus and the method according to various embodiments of the present disclosure may gradually block a network attack through multiple levels, to thus reduce the probability of determining a wrong network attack and to lower a recovery cost for network failure. Therefore, the apparatus and the method according to various embodiments of the present disclosure enable efficient network management.

18 Claims, 12 Drawing Sheets

(58) Field of Classification Search
CPC ... H04L 63/145; H04L 63/1466; H04L 51/12; G06F 21/554; G06F 21/552; G06F 17/18; G06F 21/565; G06F 21/577
See application file for complete search history.

(56) References Cited

U.S. PATENT DOCUMENTS

| | | | |
|---|---|---|---|
| 2011/0149734 A1* | 6/2011 | Park | H04L 45/38 370/235 |
| 2014/0283051 A1 | 9/2014 | Doron et al. | |
| 2015/0358287 A1 | 12/2015 | Caputo, II et al. | |
| 2016/0156648 A1 | 6/2016 | Zisapel et al. | |
| 2017/0318043 A1 | 11/2017 | Shin et al. | |
| 2018/0198732 A1* | 7/2018 | Karthikeyan | H04L 67/322 |

FOREIGN PATENT DOCUMENTS

| | | |
|---|---|---|
| KR | 10-2016-0093791 A | 8/2016 |
| KR | 10-2017-0004052 A | 1/2017 |
| KR | 10-1741357 B1 | 5/2017 |
| KR | 10-1844136 B1 | 5/2018 |

OTHER PUBLICATIONS

Akamai, "Q4 2016 State of the Internet / Security Report" vol. 3., No. 4, 2016, 25 pages.
Braga, Rodrigo, et al., "Lightweight DDoS Flooding Attack Detection Using NOX/OpenFlow," 35th Annual IEEE Conference on Local Computer Networks, LCN 2010, Denver, Colorado, 2010, 8 pages.
Giotis, K., et al., "Combining OpenFlow and sFlow for an effective and scalable anomaly detection and mitigation mechanism on SDN environments," Computer Networks, 2013, 15 pages. http://dx.doi.org/10.1016/j.bjp.2013.10.014.
Cisco, "Snort," version 2.9.15.1 release, Jan. 6, 2020, 1 page.
Open Information Security Foundation, "Suricata," Open Source IDS/IPS/NSM Engine, Feb. 13, 2020, 1 page. https://suricata-ids.org/.
Yoon, Changhoon, et al., "Enabling security functions with SDN: A feasibility study," Computer Networks, No. 85 2015, 17 pages.
Notice of Preliminary Rejection dated Aug. 10, 2021, in connection with Korean Application No. 10-2017-0103737, 10 pages.

* cited by examiner

DEVICE AND METHOD FOR HANDLING NETWORK ATTACKS IN SOFTWARE DEFINED NETWORK

CROSS-REFERENCE TO RELATED APPLICATIONS

This application is a 371 National Stage of International Application No. PCT/KR2018/009327, filed Aug. 14, 2018, which claims priority to Korean Patent Application No. 10-2017-0103737, filed Aug. 16, 2017, the disclosures of which are herein incorporated by reference in their entirety.

BACKGROUND

1. Field

The present disclosure relates generally to a communication system. More particularly, the present disclosure relates to an apparatus and a method for handling a network attack in a software defined network (SDN).

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MING (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A software defined network (SDN) indicates a network which separates a control plane as an accessible device to an individual network element (NE) of the network and is logically controlled and managed using an application at the accessible device. In the SDN, the NEs may be controlled or managed based on programming via an open application programming interface (API). The network and/or the NEs in the SDN may be controlled in a centralized manner. Such centralized management of the SDN may be advantageous in various aspects. For example, security on a network infrastructure may be effectively managed in the SDN.

SUMMARY

To address the above-discussed deficiencies of the prior art, it is a primary aspect of the present disclosure to provide an apparatus and a method for managing security in a software defined network (SDN).

Another aspect of the present disclosure is to provide an apparatus and a method for handling a network attack in an SDN.

Yet another aspect of the present disclosure is to provide an apparatus and a method for detecting a network attack in an SDN.

Still another aspect of the present disclosure is to provide an apparatus and a method for gradually blocking a network attack through multiple levels in an SDN.

According to various embodiments of the present disclosure, a method for handling a network attack in an SDN includes detecting a first candidate of the network attack in a flow during a first time interval, in response to detecting the first candidate, changing quality of service (QoS) of the flow from first QoS to second QoS, detecting a second candidate of the network attack in the flow of the second QoS during a second time interval following the first time interval, and, in response to detecting the second candidate, blocking the flow.

According to various embodiments of the present disclosure, an apparatus for handling a network attack in an SDN includes a control nit for detecting a first candidate of the network attack in a flow during a first time interval, in response to detecting the first candidate, changing QoS of the flow from first QoS to second QoS, detecting a second candidate of the network attack in the flow of the second QoS during a second time interval following the first time interval, and blocking the flow in response to detecting the second candidate.

The apparatus and the method according to various embodiments of the present disclosure may gradually block a network attack through multiple levels, to thus reduce the probability of determining a wrong network attack and to lower a recovery cost for network failure. Therefore, the apparatus and the method according to various embodiments of the present disclosure enable efficient network management.

DETAILED DESCRIPTION

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the meanings equal to the contextual meanings in the relevant field of art, and are not to be interpreted to have ideal or excessively formal meanings unless clearly defined in the present disclosure. In some cases, even where a term is defined in the present disclosure, it should not be interpreted to exclude embodiments of the present disclosure.

Now, the present disclosure provides an apparatus and a method for handling a network attack in a software defined network (SDN). More specifically, the present disclosure provides a technique for detecting network attack candidates and gradually blocking the network attack through multiple levels in the SDN.

In the following explanations, terms indicating signals, terms indicating information, terms indicating network entities, and terms indicating components of a device are mentioned for the sake of explanations. Accordingly, the present disclosure is not limited to the terms to be described, and may use other terms having technically identical meaning.

Figure 1:
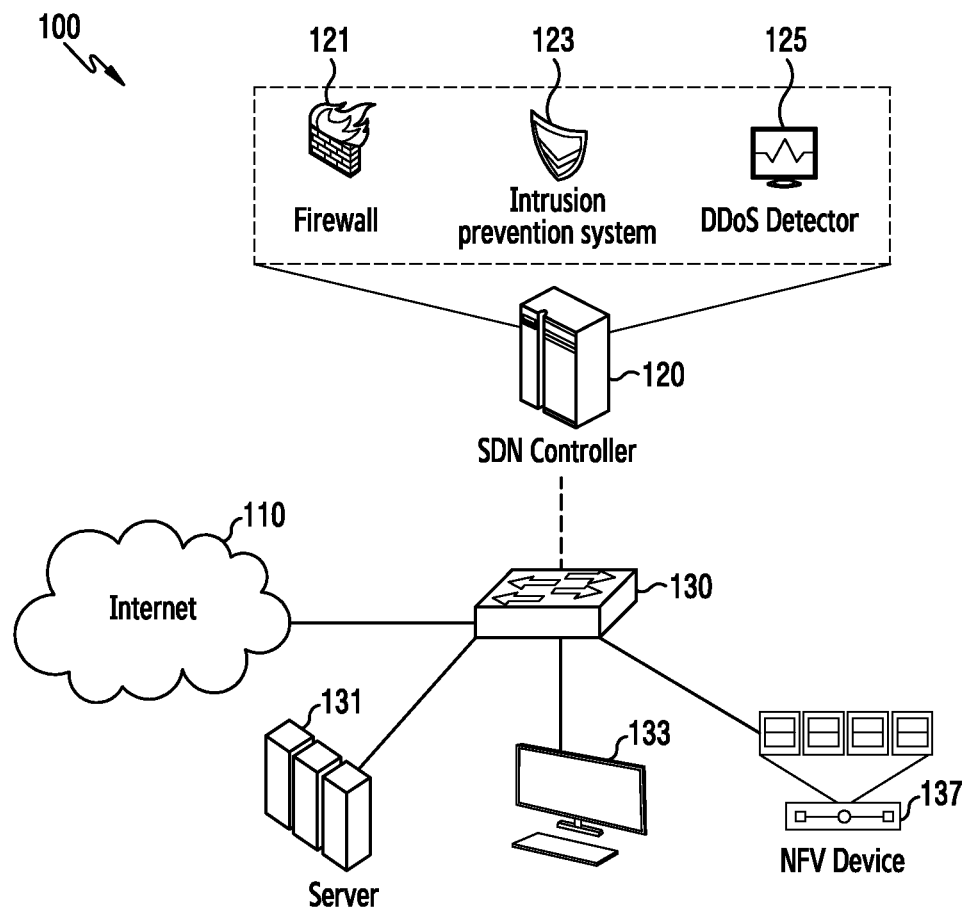
FIG. 1 illustrates a software defined network (SDN) according to various embodiments of the present disclosure.

FIG. 1 illustrates an SDN 100 according to various embodiments of the present disclosure. Referring to FIG. 1, the SDN 100 may include network entities of an Internet 110, an SDN controller 120, a switch 130, a server 131, a personal computer (PC) 133, and a network function virtualization (NFV) device 135. In FIG. 1, the Internet 110, the SDN controller 120, the server 131, the PC 133, and the MAT device 35 are connected to the switch 135, to perform mutual communications.

The Internet 110 may provide the network entities of the SDN 100 with an access to other network. For example, a packet generated from the network entities of the SDN 100 may be routed at the switch 130 and transmitted to other network over the Internet 110, Also, a packet generated from other network may be routed at the switch 130 and received at the network entities of the SDN 100 over the Internet 110.

The SDN controller 120 may manage and control the network entities of the SDN 100. For doing so, the SDN controller 120 may exchange information with the network entities. In addition, the SDN controller 120 may process to control and/or manage the network entities, and transmit a control command to at least one of the network entities according to the process result. For example, the SDN controller 120 may process to manage its security, and control at least one of the network entities according to the process result. For the security management, the SDN controller 120 may include hardware equipment and/or software program such as a firewall 121, an intrusion prevention system 123, and a distributed denial of service (DDoS) detector 125.

According to various embodiments of the present disclosure, 'security management' embraces management for protecting a network (e.g., the SDN 100) from an abnormal access. For example, the security management may protect the network (e.g., the SDN 100) from a network attack, or block a network attack on the network. The network attack may indicate a series of actions which disturb, deny, damage, and destroy information residing in the network (e.g., the SDN 100) or the network. For example, the network attack may include a DDoS attack.

The switch 130 may route packets inputted to the switch 130 to an adequate path according to a flow rule. For example, in FIG. 1, the switch 130 may receive packets from at least one of the Internet 110, the SDN controller 120, the server 131, the PC 133, and the NFV device 135, and at least one switch 130 corresponding to the flow rule may transmit the received packets to the Internet 110, the SDN controller 120, the server 131, the PC 133, and the NFV device 135. Herein, the NFV device 135 indicates a virtual device which implements its operation using software in a higher entity the SDN controller 120). For example, the NFV device 135 may include at least one virtual machine (VM).

The SDN 100 of FIG. 1 is exemplary. That is, some of the network entities (e.g., the Internet 110, the SDN controller 120, the switch 130, the server 131, the PC 133, and the NFV device 135) of the SDN 100 may be omitted in FIG. 1, and the SDN 100 may further include other network entity than the network entities of FIG. 1.

In FIG. 1, the network entities (e.g., the SDN controller 120, the switch 130, the server 131, the PC 133, and the NFV device 135) are independent hardware equipment by way of example. All or some of the network entities may be implemented using software in a single device.

Infrastructure including the network entities in the SDN 100 may be centralized and dynamically managed. Accordingly, the security management in the SDN 100 may be efficiently fulfilled. For example, a device for handling a network attack in the SDN 100 may detect the network attack and block or quarantine the detected network attack. However, such a drastic method for blocking or quarantining the network attack may adversely affect a service level agreement (SLA) adopted in the network. Hence, what is needed is an apparatus and a method for gradually blocking the network attack through multiple levels, without radically blocking or quarantining the detected network attack.

Now, an apparatus, a method, and a system for gradually blocking the network attack through multiple levels are described.

Figure 2:
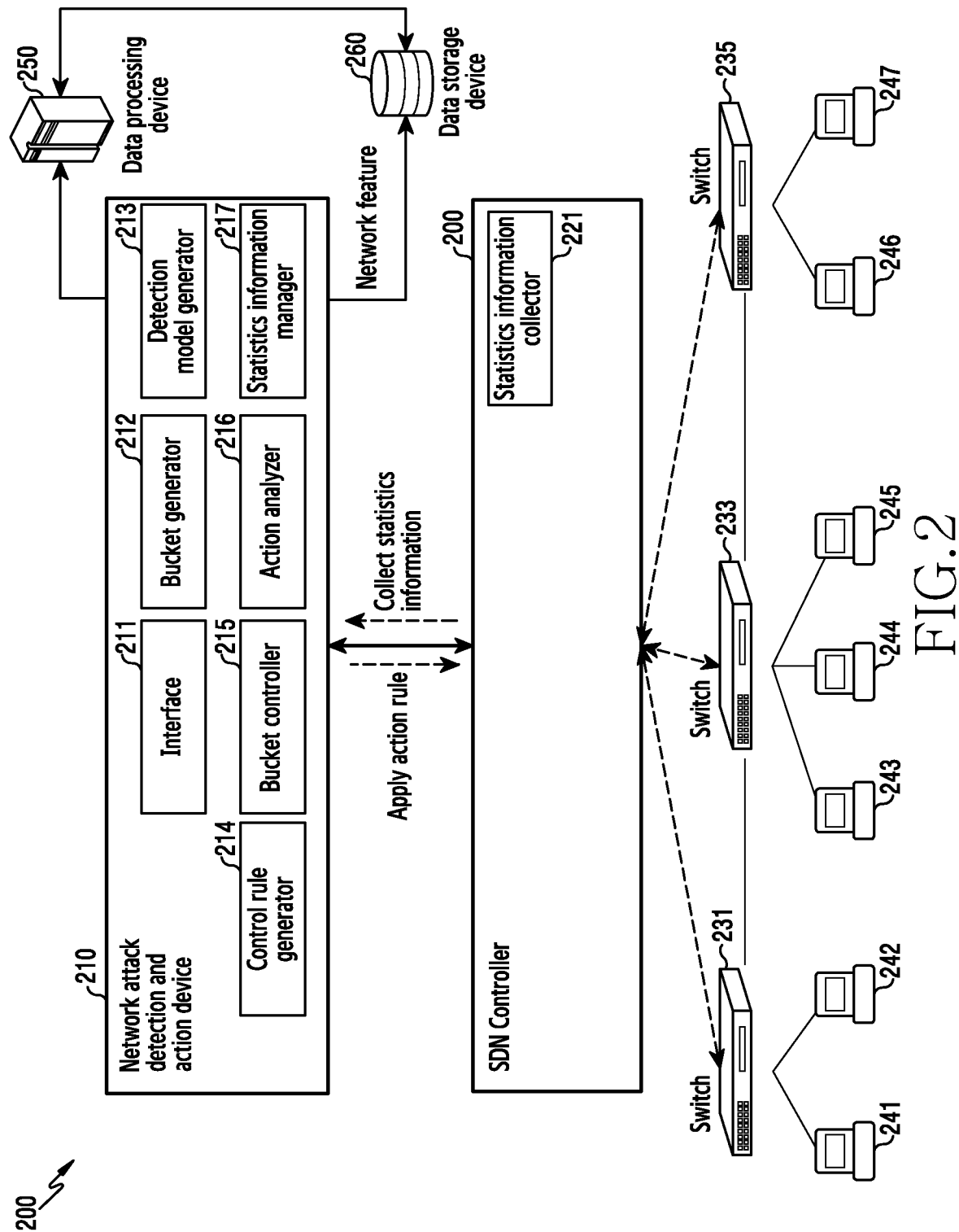
FIG. 2 illustrates a system for handling a network attack in an SDN according to various embodiments of the present disclosure.

FIG. 2 illustrates a system 200 for handling a network attack in an SDN according to various embodiments of the present disclosure. Referring to FIG. 2, the system 200 for handling the network attack in the SDN (e.g., the SDN 100) includes a network attack detection and action device 210, an SDN controller 220, switches 231, 233, and 235, VMs 241 through 247, a data processing device 250, and a data storage device 260.

The network attack detection and action device (hereafter, referred to as a handling device) 210 may generally manage the system 200 and provide a user interface. The handling device 210, which is an entity for handling the network attack according to various embodiments of the present disclosure, may detect a network attack and block the detected network attack through multiple levels. The handling device 210 may function as an upper node of the SDN controller 220 and collect various information of a data plane. For example, the handling device 210 may receive from the SDN controller 220 statistics information of flows associated with the system 200 in the data plane, and determine a network feature of the flows based on the statistics information. According to various embodiments of the present disclosure, the flow associated with the system 200 may indicate the flow of a packet or data passing at least one of the network entities (e.g., the handling device 210, the SDN 220, the switches 231, 233, and 235, the VMs 241 through 247, the data processing device 250, and the data storage device 260) of the system 200. The statistics information of the flows may include parameter values of parameters associated with the flows.

After determining the network feature of the flows, the handling device 210 may provide network feature information to the data storage device 260. The handling device 210 may receive a detection model generated based on the network feature, from the data processing device 250, and detect a network attack based on the detection model. According to various embodiments of the present disclosure, the detection model is a model for detecting a network attack, and may provide a criterion for determining whether each flow associated with the system 200 causes a network attack or is highly likely to cause a network attack. If detecting the network attack, the handling device 210 may apply an action rule to the SDN controller 220. That is, the handling device 210 may transmit to the SDN controller 220 a command for blocking the flow which causes the network attack or for performing the multi-level handling on a flow which is or is not suspected to cause the network attack. To handle the network attack, the handling device 210 may include an interface 211, a bucket generator 212, a detection model generator 213, a control rule generator 214, a bucket controller 215, an action analyzer 216, and a statistics information manager 217.

The SDN controller 220 (e.g., the SDN controller 120) may directly or indirectly manage and control its lower nodes (e.g., the switches 231, 233, and 235, the VMs 241 through 247). To handle the network attack, the SDN controller 220 may periodically request flow statistics information of the flows from the switches 231, 233, and 235, and receive the flow statistics information from the switches 231, 233, and 235. To collect the flow statistics, the SDN controller 220 may include a statistics information collector 221. According to various embodiments of the present disclosure, the flow statistics may include statistics information of the flows. The SDN controller 220 may provide the flow statistics information to the handling device 210, receive an action rule from the handling device 210, and thus block the flow causing the network attack or perform the multi-level handling on a suspicious flow or an unsuspicious flow causes the network attack.

The switches 231, 233, and 235 (e.g., the switch 130) may route packets inputted thereto to an adequate path according to a flow rule. The switches 231, 233, and 235 may collect the flow statistics of the flows which pass the switches 231, 233, and 235. For example, the switch 231 may collect the flow statistics of the flows which pass the switch 231, the switch 233 may collect the flow statistics of the flows which pass the switch 233, and the switch 235 may collect the flow statistics of the flows which pass the switch 235. The switches 231, 233, and 235 may provide the collected flow statistics information to the SDN controller 220.

The VMs 241 through 247 indicate virtual logical processors or computers are implemented using software. The VMs 241 through 247 each may further include a virtual central processing unit (CPU) and a virtual input/output (I/O) device, and may function as an independent device. The VMs 241 through 247 may generate, process, transmit, and receive data. The VMs 241 through 247 may transmit or receive packets and/or data via the switches 231, 233, and 235.

The data processing device 250 may receive network feature information of the flows from the data storage device 260, and generate a detection model based on the network feature information. If the data processing device 250 performs a machine learning algorithm based on the network feature of the flows, the detection model may be generated. The data processing device 250 may provide the generated detection model to the handling device 210.

The data storage device 260 may receive the network feature information of the flows from the handling device 210, and store the network feature information. The data storage device 260 may provide the network feature information to the data processing device 250 in response to a request from the data processing device 250.

While the network entities (e.g., the handling device 210, the SDN controller 220, the switches 231, 233, and 235, the VMs 241 through 247, the data processing device 250, and the data storage device 260) a independent hardware equipment in FIG. 2, the network entities of the system 200 may be implemented as software in a single device. For example, the SDN controller 220, the switches 231, 233, and 235, the VMs 241 through 247, the data processing device 250, and the data storage device 260 may be incorporated in the handling device 210 and implemented as a single device.

Figure 3:
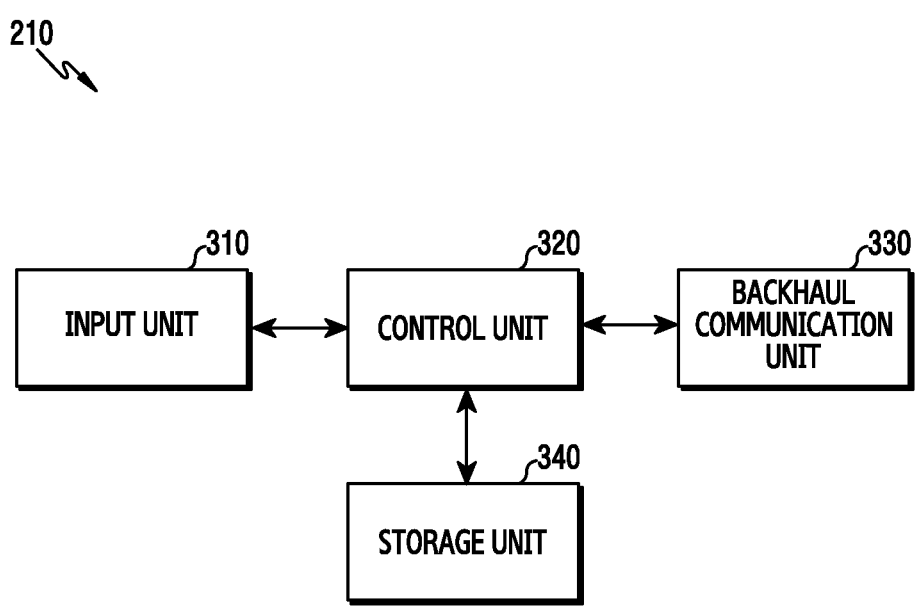
FIG. 3 illustrates a block diagram of an apparatus for handling a network attack in an SDN according to various embodiments of the present disclosure.

FIG. 3 illustrates a block diagram of an apparatus for handling a network attack in an SDN according to various embodiments of the present disclosure. The configuration of FIG. 3 may be understood as the configuration of the handling device 210. A term such as 'portion' or '~er' used in the following indicates a unit for processing at least one function or operation, and may be implemented using hardware, software, or a combination of hardware and software.

Referring to FIG. 3, the handling device 210 includes an input unit 310, a control unit 320, a backhaul communication unit 330, and a storage unit 340.

The input unit 310 may receive an input from an external device or a user. For doing so, the input unit 310 may include an input interface. The input received through the input unit 310 may be processed at the controller 320 and then transferred to the backhaul communication unit 330 and the storage unit 340. In other words, the information corresponding to the received through the input unit 310 may be transmitted to other device through the backhaul communication unit 330, or stored in the storage unit 340. According to various embodiments, the input unit 310 may include the interface 211. The input unit 310 may be referred to as a user interface.

The control unit 320 may control general operations of the handling device 210. For example, the control unit 320 may transmit and receive signals through the backhaul communication unit 330. In addition, the control unit 320 may record and read data in and from the storage unit 340. The control unit 320 may perform functions of a protocol stack required by a communication standard. For doing so, the control unit 320 may include at least one processor. According to various embodiments, the control unit 320 may include the bucket generator 212, the detection model generator 213, the control rule generator 214, the bucket controller 215, the action analyzer 216, the statistics information manager 217, the statistics information collector 221, and the data processing device 250. Herein, the bucket generator 212, the detection model generator 213, the control rule generator 214, the bucket controller 215, the action analyzer 216, the statistics information manager 217, the statistics information collector 221, and the data processing device 250 may be, as an instruction set or code stored in the storage unit 340, a storage space storing the instructions/code resided in the control unit 320 at least temporarily, or part of circuitry of the control unit 320.

According to various embodiments, the control unit 320 may detect a first candidate of the network attack in the flow during a first time interval, change quality of service (QoS) of the flow from first QoS to second QoS in response to detecting the first candidate, detect a second candidate of the network attack in the flow of the second QoS during a second time interval following the first time interval, and block the flow in response to detecting the second candidate. For example, the control unit 320 may control the handling device 210 to fulfill the operations to be explained according to various embodiments.

The backhaul communication unit 330 provides an interface for communicating with other nodes in the network. That is, the backhaul communication unit 330 converts a bit stream transmitted from the handling device 210 to other node, to a physical signal, and converts a physical signal received from other node, to a bit stream.

The storage unit 340 may store a basic program for the operations of the handling device 210, an application program, and data such as setting information. The storage unit 340 may include a volatile memory, a non-volatile memory, or a combination of a volatile memory and a non-volatile memory. The storage unit 340 provides the stored data according to a request of the control unit 320. According to various embodiments, the storage unit 340 may include the data storage device 260.

Although not depicted, the handling device 210 may further include a display. The display may display a screen including an image, a graphic, a text, and so on. For example, the display may be configured with a liquid crystal, a light emitting diode display, or other material. The display may display information corresponding to the input received through the input unit 310, and display a screen corresponding to data processed at the control unit 320. In addition, the display may include a touch screen for detecting a user's input. In this case, the display may function as the input unit 310, and receive an input from the external device or the user through the touch screen.

Figure 4:
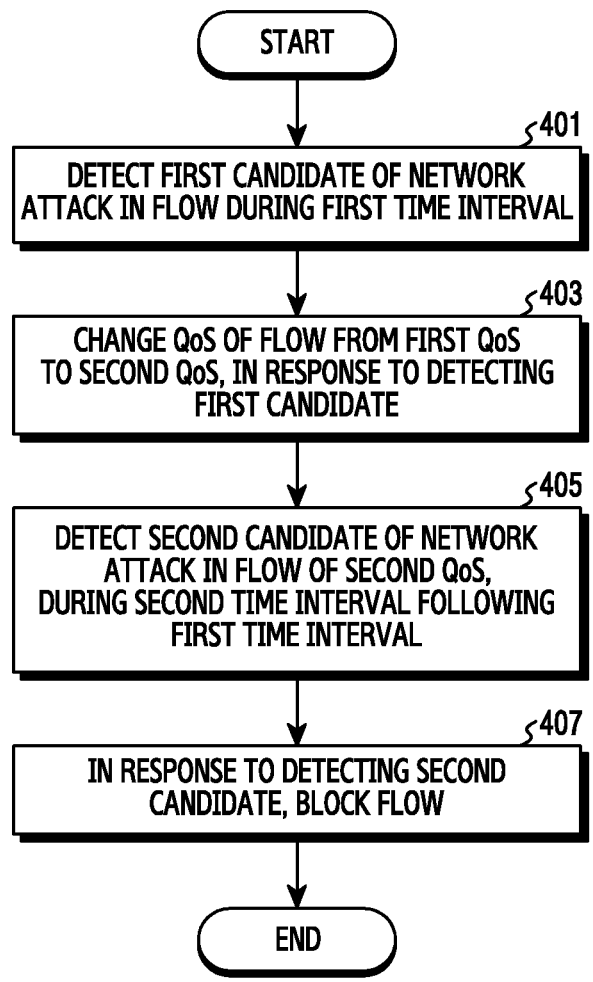
FIG. 4 illustrates a flowchart of operations of an apparatus for handling a network attack in an SDN according to various embodiments of the present disclosure.

FIG. 4 illustrates a flowchart of operations of an apparatus for handling a network attack in an SDN according to various embodiments of the present disclosure. FIG. 4 illustrates an operating method of the handling device 210.

Referring to FIG. 4, in operation 401, the handling device 210 detects a first candidate of a network attack in a flow during a first time interval. According to various embodiments of the present disclosure, the candidate of the network attack indicates high probability of the network attack. That is, detecting the candidate of the network attack in the flow may correspond to determining that the network attack is highly likely to occur in a corresponding flow. More specifically, the handling device 210 may count the number of times a suspicious flow is detected (or the number of alerts in each flow) in a unit time interval (e.g., the first time interval), based on a detection model. If the number of the alerts in each flow during the unit time is equal to or greater than a reference number, the handling device 210 may detect the candidate of the network attack in the corresponding flow. For example, if the number of the alerts in the flow during the unit time is less than the reference number, the handling device 210 may not detect the candidate of the network attack in the corresponding flow or may determine low probability of the network attack in the corresponding flow. According to various embodiments of the present disclosure, the unit time interval may be set to, but not limited to, one minute.

In operation 403, the handling device 210 changes the QoS of the flow from the first QoS to the second QoS, in response to detecting the first candidate. Herein, the second QoS may be lower than the first QoS. That is, if detecting the candidate of the network attack in the flow, the handling device 210 according to various embodiments of the present disclosure reduces the QoS of the corresponding flow, rather than immediately blocking or quarantining the corresponding flow. Thus, the handling device 210 may guarantee relatively high QoS for other positive flows having low probability of the network attack, and conform to the SLA with respect to all of the flows.

In operation 405, the handling device 210 may detect a second candidate of the network attack in the flow of the second QoS, during a second time interval following the first time interval. Herein, the second time interval may be equal to the first time interval in duration. The handling device 210 may determine that the number of the alerts in the flow of the second QoS is equal to or greater than the reference number, and detect the candidate of the network attack in the flow of the second QoS.

In response to detecting the second candidate, the handling device 210 blocks the flow in operation 407. That is, since the candidate of the network attack is still detected in the flow during the second time interval after the first time interval, the handling device 210 conclusively determines the network attack in the corresponding flow, and blocks the corresponding flow. Herein, blocking the flow may include blocking a port associated with the flow, or dropping a packet associated with the flow.

Although not depicted, if not detecting the second candidate of the network attack in the flow of the second QoS during the second time interval (i.e., if the probability of the network attack is low), the handling device 210 may not block the flow but may increase the QoS of the flow. For example, the QoS of the flow may be changed from the second QoS back to the first QoS.

As described in FIG. 4, the handling device 210 according to various embodiments of the present disclosure may gradually block the network attack through multiple levels, thus reducing the probability of determining a wrong network attack and lowering a recovery cost for network failure, in addition, the handling device 210 according to various embodiments of the present disclosure may gradually block the network attack through multiple levels, thus enabling efficient network management.

In FIG. 4, the duration of the first time interval, the duration of the second time interval, and the reference number may be preset. For example, at least one of the duration of the first time interval, the duration of the second time interval, and the reference number may be configured through the input unit 310. That is, at least one of the duration of the first time interval, the duration of the second time interval, and the reference number may change according to user's setting.

Figure 5:
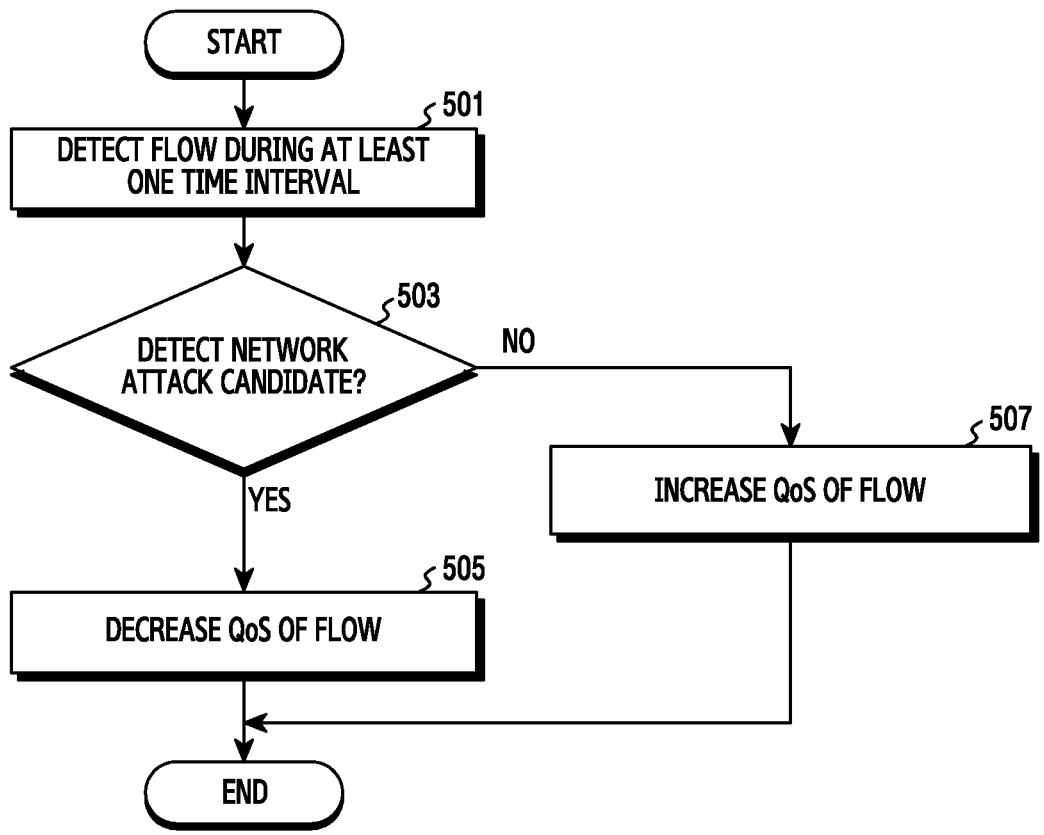
FIG. 5 illustrates a flowchart of multi-level operations of an apparatus for handling a network attack in an SDN according to various embodiments of the present disclosure.

FIG. 5 illustrates a flowchart of multi-level operations of an apparatus for handling a network attack in an SDN according to various embodiments of the present disclosure.

FIG. 5 illustrates an operating method of the handling device 210. The operations of FIG. 5 may be performed before operation 401 of FIG. 4.

Referring to FIG. 5, in operation 501, the handling device 210 may detect a flow during at least one time interval. For example, the handling device 210 may detect alerts in the flow during the unit time interval, and count the alerts. The at least one time interval of operation 501 may precede the first time interval of operation 401. A duration of the at least one time interval may be preset, or set by an input through the input unit 310.

In operation 503, the handling device 210 determines whether a network attack candidate is detected in the flow. For example, if the number of the alerts in the flow during the unit time interval is equal to or greater than a reference number, the handling device 210 may detect the network attack candidate in the flow. For example, if the number of the alerts in the flow during the unit time interval is less than the reference number, the handling device 210 may not detect the network attack candidate in the flow, or may determine low probability of the network attack in the flow. The reference number may be preset, or set by an input through the input unit 310.

If detecting the network attack candidate in the flow, the handling device 210 may reduce QoS of the flow in operation 505. Namely, if detecting the network attack candidate in the flow, the handling device 210 according to various embodiments of the present disclosure may reduce the QoS of the corresponding flow, rather than immediately blocking or quarantining the corresponding flow.

If not detecting the network attack candidate in the flow, the handling device 210 may increase the QoS of the flow in operation 507. Namely, if detecting the network attack candidate during a previous e interval and not detecting the network attack candidate in the flow of the reduced QoS during a next e interval, the handling device 210 may increase the QoS of the flow. Hence, the handling device 210 may flexibly cope with the network attack candidate detected wrong in the flow during the previous time interval, or with a network attack removed in the flow.

Although not depicted, although the network attack candidate is not detected in the flow during the unit time interval, if the flow already obtains optimal QoS allowed in the system 200, the handling device 210 may maintain the QoS of the flow, rather than increasing the QoS of the flow.

Figure 6A:
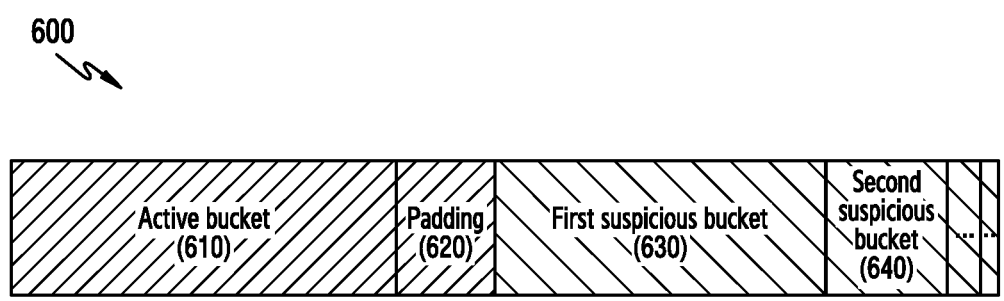
FIG. 6A illustrates a logical bucket structure in an SDN according to various embodiments of the present disclosure.

FIG. 6A illustrates a logical bucket structure 600 in an SDN according to various embodiments of the present disclosure. According to various embodiments of the present disclosure, the bucket indicates a logical group or set corresponding to the QoS of a particular level or range. For example, a flow in a specific bucket may obtain the QoS of the level or range corresponding to the flow.

Referring to FIG. 6A, the bucket structure 600 include a plurality of buckets. For example, the bucket structure 600 may include an active bucket 610, a padding 620, a first suspicious bucket 630, and a second suspicious bucket 640. Although not depicted, the bucket structure 600 may further include at least one bucket, in addition to the first suspicious bucket 630 and the second suspicious bucket 640. In the bucket structure 600, a width of each bucket indicates a bandwidth (a sort of QoS) corresponding to each bucket. The flow in each bucket may receive the bandwidth corresponding to each bucket. The bandwidth corresponding to each bucket may be referred to as a bucket size.

The active bucket 610 corresponds to the QoS of the highest level or range in the bucket structure 600. In other words, the flow in the active bucket 610 may receive the QoS of the highest level or range. For example, the active bucket 610 may include positive flows in which a network attack candidate is not detected or a probability of the network attack is low.

The first suspicious bucket 630 corresponds to the QoS of a level or range which is lower than the QoS of the active bucket 610 and higher than a QoS of the second suspicious bucket 640 in the bucket structure 600. For example, the first suspicious bucket 630 may include flows in which the network attack candidate is detected at least once.

The padding 620 corresponds to QoS of the same level or range as the QoS of the active bucket 610, and may function as a buffer which prevents sharp division of the active bucket 610 and the first suspicious bucket 630. For example, the padding 620 may provide an additional bandwidth to the active packet 610 if the active bucket 610 includes more flows, wherein more flows obtain high QoS. The bandwidth of the padding 620 may be set to, but not limited to, 1/10 of the bandwidth of the active bucket 610. According to various embodiments of the present disclosure, the padding 620 may be omitted in the bucket structure 600.

The second suspicious bucket 640 corresponds to QoS of a lower level or range than the QoS of the first suspicious bucket 630 in the bucket structure 600. For example, the second suspicious bucket 640 may include flows in which the network attack candidate is detected at least twice.

The bucket structure (e.g., the bucket structure 600) may be determined by the handling device 210. That is, the handling device 210 may generate a bucket. Parameters for generating the bucket are described in Table 1.

TABLE 1

Required parameters for creating a bucket # of suspicious buckets [Count] (#SB) // Total number of suspicious buckets
# of alerts [Count] (#AL) // The threshold number of alerts that occurred in the flow(=reference number)
Total bandwidth [Bandwidth] (TB) // Total bandwidth that the switch can handle
Active bucket size [Bandwidth] (AB) // Bandwidth corresponding to active bucket
Total Suspicious Bucket Size [Bandwidth] (TS) = Bandwidth corresponding to total suspicious buckets
N-Suspicious bucket size [Bandwidth] (SBn) //The bandwidth corresponding to the N-th suspicious bucket $$:= SBn = TS \qquad (n == 1)$$

$$:= SN_{n-1} = SN_{n-1} \times \frac{2}{3} \qquad (n >= 2)$$

$$:= SN_n = SN_{n-1} \times \frac{1}{3}$$

At least one of the parameters in Table 1 may be set by an input through the input unit 310.

The flow is not included constantly in the same bucket, and may be included in a different bucket based on time. That is, the flow may be included in a bucket A during a specific time interval, and may be included in a bucket B which is different from the bucket A, during other time interval. According to various embodiments of the present disclosure, changing the bucket including the flow may be referred to as bucket movement of the flow. Since the QoS varies per bucket, the bucket movement may correspond to changing the QoS of the flow. That is, the handling device 210 according to various embodiments of the present disclosure changes the QoS of the flow based on whether the network attack candidate is detected in the flow per unit time interval, and such an operation of the handling device 210 may be explained with the bucket movement.

Figure 6B:
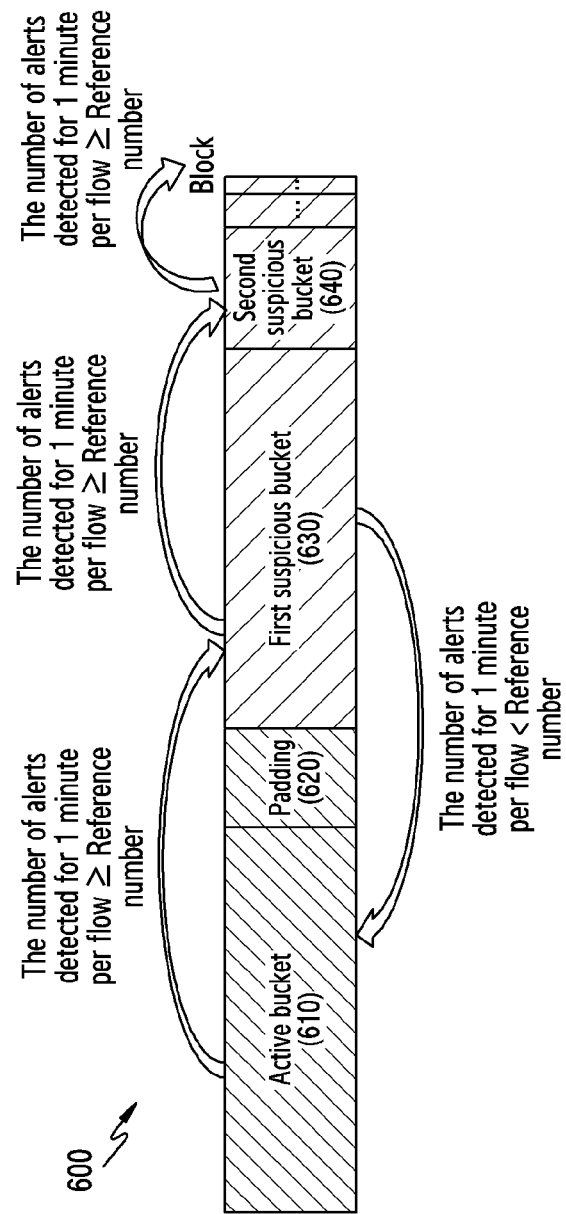
FIG. 6B illustrates bucket movement in an SDN according to various embodiments of the present disclosure.

Now, a bucket movement algorithm is described in FIG. 6B.

FIG. 6B illustrates the bucket movement in an SDN according to various embodiments of the present disclosure. It is assumed that all of flows are included in the active bucket 610, before the bucket movement.

The handling device 210 determines which one of the flows in the active bucket 610 a network attack candidate is detected in during the unit time interval (e.g., 1 minute). That is, the handling device 210 determines whether the number of alerts in the flow during the unit time interval is greater than or equal to the reference number. If detecting the network attack candidate in the flow, the handling device 210 changes the bucket including the flow from the active bucket 610 to the first suspicious bucket 630. In other words, the handling device 210 performs the bucket movement of the flow from the active bucket 610 to the first suspicious bucket 630. According to the bucket movement, the QoS provided to the flow may reduce from the QoS of the active bucket 610 to the QoS of the first suspicious bucket 630. On the contrary, if detecting no network attack candidate in the flow or determining low probability of the network attack candidate in the flow, the handling device 210 may not perform the bucket movement because the flow already obtains the QoS of the active bucket 610.

The handling device 210 determines which one of the flows of the first suspicious bucket 630 the network attack candidate is detected in during the unit time interval (e.g., 1 minute). For example, the flow in the first suspicious bucket 630 may be included in the active bucket 610 in a previous time interval, or in the second suspicious bucket 640. If detecting the network attack candidate in the flow, the handling device 210 may perform the bucket movement of the flow from the first suspicious bucket 630 to the second suspicious bucket 640. On the contrary, if detecting no network attack candidate in the flow or determining low probability of the network attack candidate in the flow, the handling device 210 may perform the bucket movement from the first suspicious bucket 630 to the active bucket 610. Namely, if the network attack candidate is detected in the active bucket 610 and no network attack candidate is detected during the unit time interval in the flow of the bucket movement to the first suspicious bucket 630, the bucket of the flow may be moved to a bucket of relatively high QoS.

According to various embodiments of the present disclosure, the bucket movement may include negative bucket movement and positive bucket movement. The negative bucket movement indicates bucket movement from the bucket of relatively high QoS to the bucket of relatively low QoS, and the positive bucket movement indicates bucket movement from the bucket of relatively low QoS to the bucket of relatively high QoS. For example, if a network attack candidate is detected in the flow, the negative bucket movement of the flow may be performed. For example, if no network attack candidate is detected in the flow or low probability of the network attack candidate in the flow is determined, the positive bucket movement may be performed or the bucket movement may not be conducted.

The handling device 210 determines which one of the flows of the second suspicious bucket 640 the network attack candidate is detected during the unit time interval (e.g., 1 minute). For example, the flow in the second suspicious bucket 640 may be included in the first suspicious bucket 630 in the previous time interval. If detecting the network attack candidate in the flow, the handling device 210 blocks the flow. In other words, if a suspicious bucket corresponding to the lower QoS than the QoS of the second suspicious bucket 640 is not defined in the bucket structure 600, the handling device 210, which may not perform the negative bucket movement of the flow, may conclusively determine the network attack in the flow and block the flow. As such, even if the network attack candidate is detected in the flow, the handling device 210 according to various embodiments of the present disclosure may conduct multiple bucket movements (e.g., the active bucket 610→the first suspicious bucket 630→the second suspicious bucket 640) and thus gradually block the network attack through multiple levels, rather than immediately blocking or quarantining the flow.

Although not depicted, if a suspicious bucket (e.g., a third suspicious bucket) corresponding to the lower QoS than the QoS of the second suspicious bucket 640 is defined in the bucket structure 600, the handling device 210 may perform the negative bucket movement of the flow from the second suspicious bucket 640 to the third suspicious bucket, in response to detecting the network attack candidate in the flow of the second suspicious bucket 640. If detecting no network attack candidate in the flow of the second suspicious bucket 640 or determining low probability of the network attack candidate in the flow, the handling device 210 may perform the positive bucket movement of the flow from the second suspicious bucket 640 to the first suspicious bucket 630.

According to various embodiments of the present disclosure, the number of net negative bucket movements may be defined. The number of the net negative bucket movements is produced by subtracting the total number of the positive bucket movements from the total number of the negative bucket movements in the flow. A maximum number of the number of the net negative bucket movements may be determined based on the number of the suspicious buckets in the bucket structure (e.g., the bucket structure 600). For example, if the bucket structure includes two suspicious buckets, the number of the net negative bucket movements does not exceed two and accordingly the maximum value of the net negative bucket movements may be determined to two. That is, the maximum value of the net negative bucket movements may be equal to the number of the suspicious buckets in the bucket structure. In addition, the maximum value of the net negative bucket movements may indicate the maximum number of the consecutive negative bucket movements in the bucket structure, and indicate the maximum number of times for consecutively reducing the QoS of the flow. According to various embodiments of the present disclosure, the the bucket structure, the maximum number of the consecutive negative bucket movements in the bucket structure, and the maximum number of times for consecutively reducing the QoS of the flow may be set according to an input through the input unit 310.

According to various embodiments of the present disclosure, a bucket value may be assigned to each bucket in the bucket structure. In this case, the bucket movement may be understood as the change of the bucket value of the flow. For example, in the bucket structure, the bucket value of the active bucket may be zero and the bucket value of the suspicious buckets may increase by one as the QoS reduces. Hence, the maximum bucket value may be equal to the number of the suspicious buckets in the bucket structure. For example, in the bucket structure 600, the bucket value of the active bucket 610 may be set to zero, the bucket value of the first suspicious bucket 630 may be set to 1, and the bucket value of the second suspicious bucket 640 may be set to 2, if the bucket structure 600 does not include other suspicious bucket than the first suspicious bucket 630 and the second suspicious bucket 640 (i.e., the two suspicious buckets), the maximum bucket value in the bucket structure 600 may be 2. The bucket value of the flow may indicate that the flow is included in the bucket of the bucket value. For example, if the flow is included in the active bucket 610, the bucket value of the flow may be zero. If the flow is included in the first suspicious bucket 630, the bucket value of the flow may be 1. If the flow is included in the second suspicious bucket 640, the bucket value of the flow may be 2.

The bucket value of the flow decreases if the negative bucket movement is conducted in the flow, and the bucket value of the flow increases if the positive bucket movement is conducted in the flow. If the bucket value of the flow is greater than the maximum bucket value defined in the bucket structure, the handling device 210 blocks the flow. In other words, if not conducting the negative bucket movement any more in the flow, the handling device 210 conclusively determines the network attack in the flow and blocks the flow. By contrast, if the bucket value of the flow is smaller than zero, the handling device 210 resets the bucket value of the flow to zero. In other words, if not conducting the positive bucket movement any more in the flow, the handling device 210 does not perform the bucket movement of the flow.

The bucket movement algorithm as stated above may be described as shown in Table 2.

TABLE 2

Bucket movement algorithm

Current_Bucket = 0
  Total_Bucket = #SB
  IF alerts >= #AL THEN:
      IF Current_Bucket + 1 > Total_Bucket THEN:
          ISSUE_Block_RULE( )
      ELSE THEN:
          MOVE (Flow, SB $_{(Current\_Bucket\ +\ 1)}$ )
  ELSE THEN
      IF Current_bucket −1 < = 0
          DO_NOTHING( )
      ELSE THEN:
          MOVE (Flow, SB $_{(Current\_Bucket\ -\ 1)}$ )

Current_bucket indicates the bucket value of the flow in a current time interval. An initial value of the bucket value for the flow may be set to zero. That is, before the bucket movement, all of the flows are included in the active bucket. Total_bucket is the maximum bucket value defined in the bucket structure and is equal to the number of the suspicious buckets in the bucket structure. ISSUE_Block_RULE( ) indicates a command for blocking the flow, and MOVE indicates a command for the bucket movement. DO_NOTHING( ) indicates a command for no bucket movement.

Figure 7:
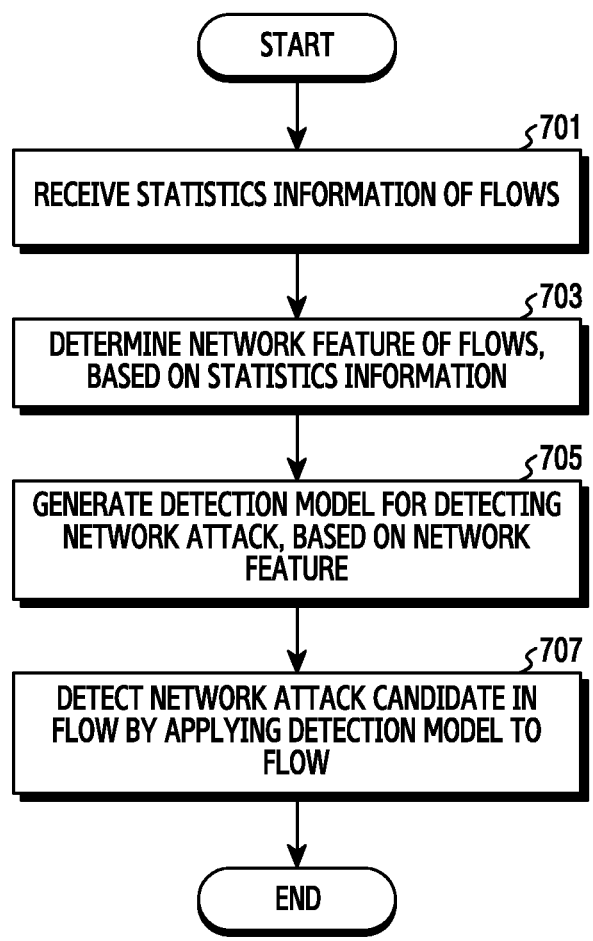
FIG. 7 illustrates a flowchart of attack detecting operations of an apparatus for handling a network attack in an SDN according to various embodiments of the present disclosure.

FIG. 7 illustrates a flowchart of attack detecting operations of an apparatus for handling a network attack in an SDN according to various embodiments of the present disclosure. FIG. 7 illustrates an operating method of the handling device 210.

Referring to FIG. 7, in operation 701, the handling device 210 receives statistics information of flows. The statistics information may include parameter values of parameters associated with the flows.

In operation 703, based on the statistics information, the handling device 210 determines a network feature of the flows. The handling device 210 may determine the network feature of the flows based on at least one of the parameter values of the parameters associated with the flows and/or values derived from the parameter values. For example, to determine the network feature of the flows, the handling device 210 may identify the parameter values of the parameters associated with the flows and identify the values derived from the parameter values.

In operation 705, the handling device 210 generates a detection model for detecting a network attack, based on the network feature. For example, if conducting the machine learning algorithm based on the network feature of the flows, the handling device 210 may generate the detection model.

In operation 707, the handling device 210 detects a network attack candidate in the flow by applying the detection model to the flow. For example, by applying the detection model to the flow, the handling device 210 may determine that the number of alerts in the flow during the unit time is equal to or greater than the reference number, and detect the network attack candidate in the flow.

According to various embodiments of the present disclosure, examples of the parameters associated with the flows, the values derived from the parameter values (hereafter, referred to as derived parameters) and the machine learning algorithm are shown in Table 3.

TABLE 3

| Network feature | Parameter | duration_sec, duration_n_sec, idle_timeout, hard_timeout, byte_count, packet_count |
|---|---|---|
| | Derived parameters | byte_count/packet_count, packet_count/duration_sec, pair_flow (T/F), total_pair_flow, pair_flow_ratio (=total_pair_flow/total_flows) |
| Machine learning algorithm | | K-means, linear regression | duration_sec denotes time per second elapsed after the flow rule is set, duration_n_sec denotes time per nanosecond elapsed after the flow rule is set, idle_timeout denotes time for erasing the flow rule if matching for the flow rule does not occur (i.e., the flow rule is erased if there is no matching for the flow rule during idle_timeout), hard_timeout denotes time for erasing the flow rule regardless of the matching for the flow rule (i.e., the flow rule is erased if hard_timeout elapses after the flow rule is set), byte_count denotes a bytewise size of a packet matched to the flow rule, and packet_count denotes the number of packets matched to the flow rule. pair_flow indicates whether the flow is bi-directional, and may have a value of true or false. total_pair_flow denotes the number of bidirectional flows, total_flows denotes the total number of the flows, and pair_flow_radio denotes a ratio of the bidirectional flows to the flows. The machine learning algorithm includes at least one of K-means and ea cession.

According to various embodiments of e present disclosure, at least one parameter and/or at least one derived parameter for determining the network feature may be selected by an input through the input unit 310. The handling device 210 may identify the selected at least one parameter and/or at least one derived parameter, and determine the network feature based on the identified values.

Figure 8:
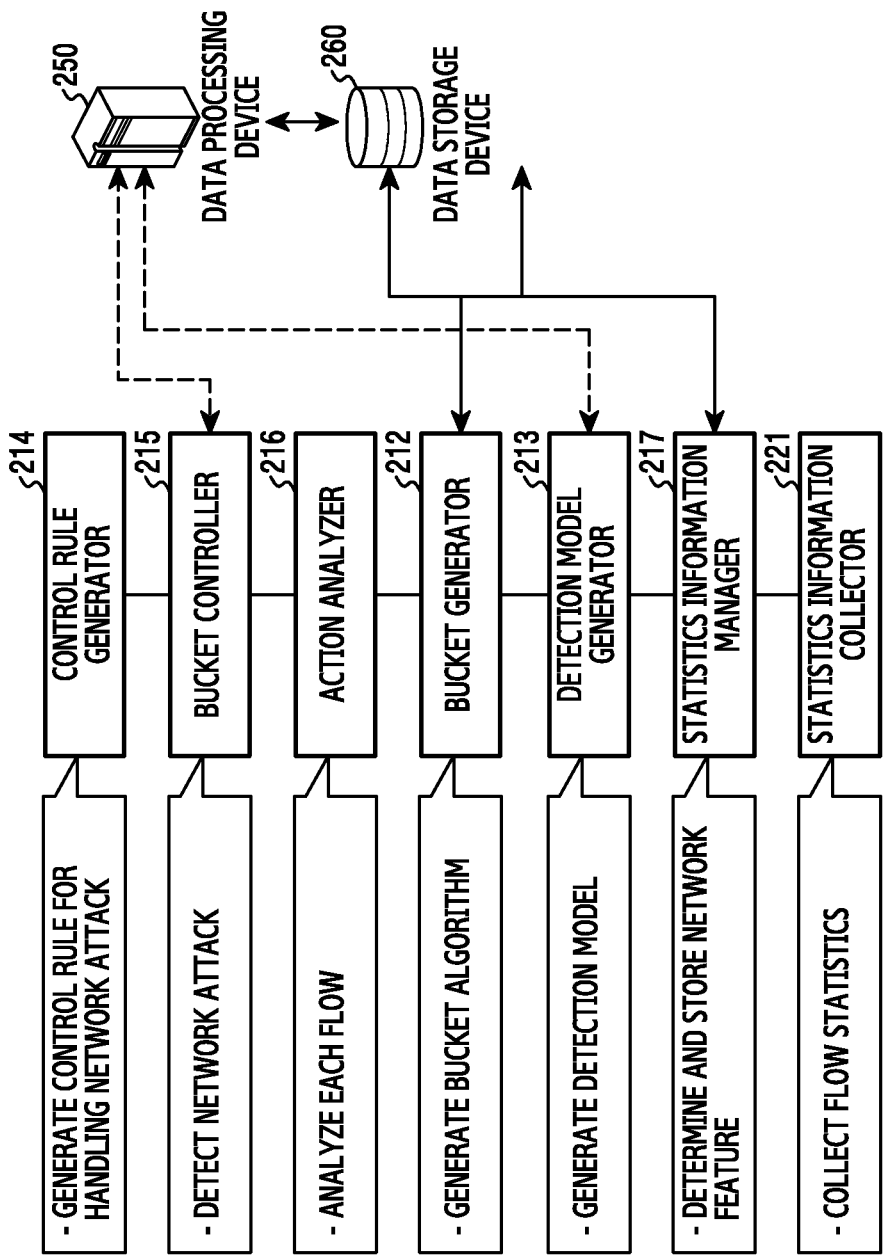
FIG. 8 illustrates a flowchart of operations of elements of an apparatus for handling a network attack in an SDN according to various embodiments of the present disclosure.

FIG. 8 illustrates a flowchart of operations of elements of an apparatus for handling a network attack in an SDN according to various embodiments of the present disclosure. More specifically, FIG. 8 illustrates the flowchart of the operations of the bucket generator 212, the detection model generator 213, the control rule generator 214, the bucket controller 215, the action analyzer 216, the statistics information manager 217, and the statistics information collector 221 of the handling device 210.

The statistics information collector 221 collects flow statistics of flows. The statistics information collector 221 may periodically request the flow statistics of flows associated with a plurality of switches, from the switches, and receive flow statistics information from the switches. The flow statistics of flows may include statistics information of the flows.

The statistics information manager 217 determines a network feature based on the flow statistics of the flows, and stores the determined network feature. The statistics information manager 217 may store the network feature of the flows in the data storage device 260.

The detection model generator 213 generates a detection model for detecting a network attack based on the network feature. According to various embodiments of the present disclosure, the detection model may be generated at the data processing device 250. The data storage device 260 may provide network feature information to the data processing device 250, and the data processing device 250 may generate the detection model based on the network feature. If generating the detection model, the data processing device 250 may provide the generated detection model to the detection model generator 213.

The bucket generator 212 may generate a bucket algorithm. The bucket generator 212 determines a bucket structure and determines parameters to be used in the bucket algorithm. For example, the bucket generator 212 may determine at least one of the total number of buckets to be used in the bucket algorithm, the total number of suspicious buckets (a maximum number of net negative bucket movements, the number of the suspicious buckets in the bucket structure, a maximum number of consecutive negative bucket movements in the bucket structure, or a maximum number of times for consecutively reducing flow QoS), a QoS level or range corresponding to each bucket, a threshold value (i.e., a reference number) for the number of alerts in the flow to determine a network attack candidate, a total bandwidth processed by the switch, a bandwidth corresponding to an active bucket, a bandwidth corresponding to the total suspicious buckets, a bandwidth corresponding to each suspicious bucket, a triggering condition of the bucket movement, a triggering condition of bucket maintenance (i.e., no bucket movement), and a triggering condition of flow blocking. The bucket generator 212 may store the parameters to be used in the bucket algorithm, in the data storage device 260. According to various embodiments of the present disclosure, the parameters to be used in the bucket algorithm may be determined by an input through the input unit 310.

The action analyzer 216 analyzes each flow. For example, the action analyzer 216 may count the alerts in each flow during the unit time, and determine whether the network attack candidate is detected in the flow.

The bucket controller 215 detects the network attack based on the bucket algorithm. For example, the bucket controller 21 may determine a flow of the network attack, through multiple bucket movements of the flow. According to various embodiments of the present disclosure, the bucket algorithm conducted by the bucket controller 215 may be performed by the data processing device 250. In other words, the bucket controller 215 may provide necessary information for the bucket algorithm to the data processing device 250, wherein the data processing device 250 fulfills the bucket algorithm.

The control e generator 214 generates a control rule or an action rule for handling the detected network attack. The control rule or the action rule may include a command for blocking the flow which is determined to cause the network attack. The control rule generator 214 may transmit the generated control rule or action rule to the switch associated with the flow which is determined to cause the network attack, wherein the switch blocks a port associated with the flow or drops a packet associated with the flow.

Figure 9:
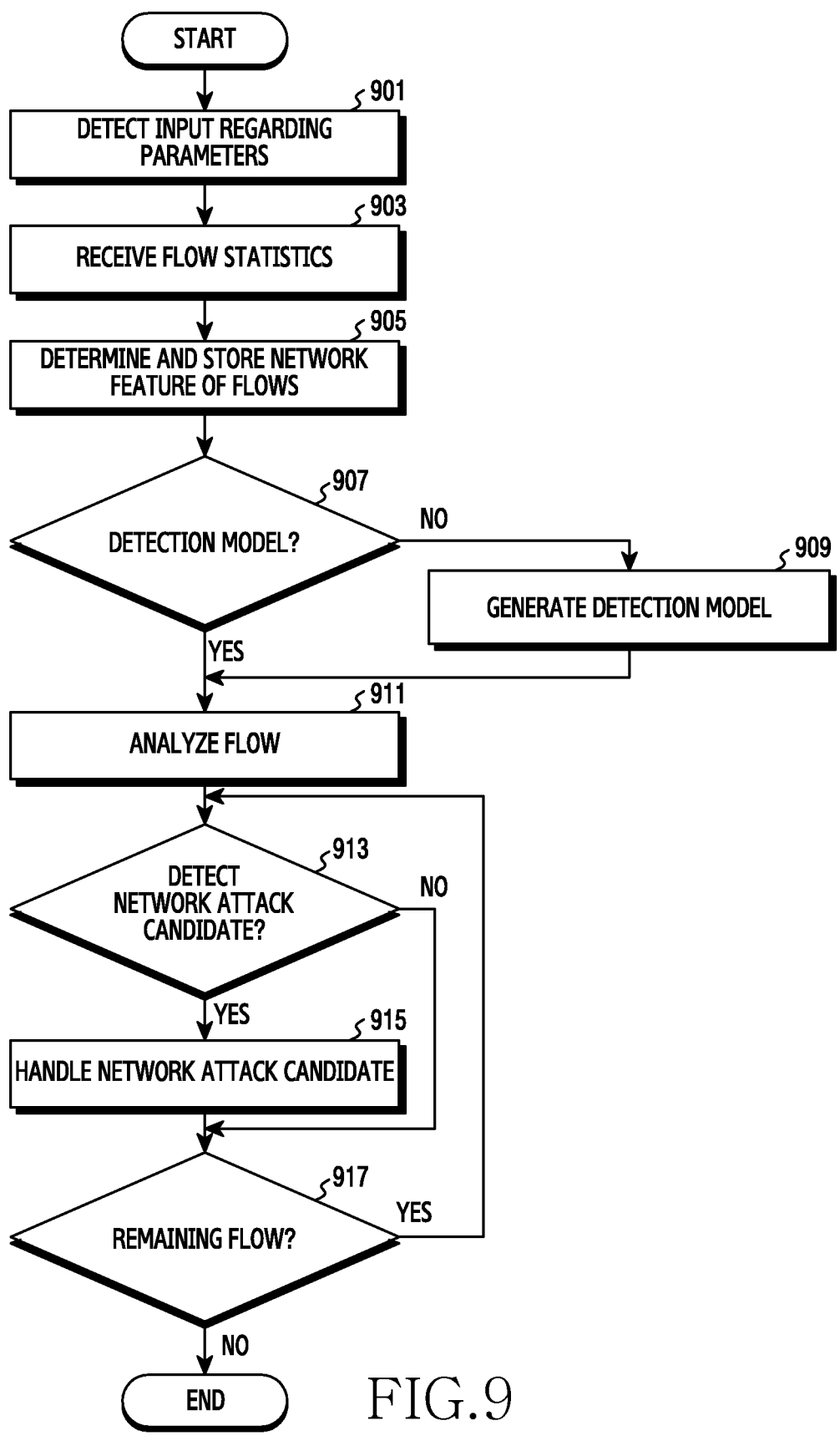
FIG. 9 illustrates a flowchart of operations for handling a network attack in an SDN according to various embodiments of the present disclosure.

FIG. 9 illustrates a flowchart of operations for handling a network attack in an SDN according to various embodiments of the present disclosure. FIG. 9 illustrates an operating method of the handling device 210.

Referring to FIG. 9, in operation 901, the handling device 210 detects an input regarding parameters. The parameters include a parameter to be used to determine a network feature, and a parameter to be used in a bucket algorithm. The parameter to be used to determine the network feature may include at least one of the parameters and the derived parameters of Table 3. The parameter to be used in the bucket algorithm may include at least one of the total number of buckets to be used in the bucket algorithm, the total number of suspicious buckets maximum number of net negative bucket movements, the number of the suspicious buckets in the bucket structure, a maximum number of consecutive negative bucket movements in the bucket structure, the maximum number of times for reducing flow QoS, a maximum bucket value defined in the bucket structure), a QoS level or range corresponding to each bucket, a threshold value (i.e., a reference number) for the number of alerts in the flow to determine a network attack candidate, a total bandwidth processed by the switch, a bandwidth corresponding to an active bucket, a bandwidth corresponding to total suspicious buckets, a bandwidth corresponding to each suspicious bucket, a triggering condition of the bucket movement, a triggering condition of bucket maintenance, and a triggering condition of flow blocking.

According to various embodiments of the present disclosure, the parameter to be used to determine the network feature and the parameter to be used in the bucket algorithm may be determined in advance. In this case, operation 901 may be omitted.

In operation 903, the handling device 210 receives flow statistics. The flow statistics may include statistic information of flows, and the statistics information may include parameter values of parameters (e.g., the parameters of Table 3) associated with the flows.

In operation 905, the handling device 210 determines the network feature of the flows and stores the determined network feature. The handling device 210 may determine the network feature based on the statistics information. For example, the handling device 210 may identify a parameter value of at least one parameter predetermined in the statistics information of each flow or at least one parameter inputted in operation 901, and determine the network feature if identifying a parameter value of at least one derived parameter predetermined by combining the identified parameter values or at least one derived parameter inputted in operation 901.

In operation 907, the handling device 210 may determine whether a detection model exists. That is, the handling device 210 determines whether the system includes the detection model which is generated in advance.

Without the detection model, the handling device 210 generates a detection model in operation 909. Based on the network feature, the handling device 210 may generate the detection model for detecting a network attack. If performing a machine learning algorithm based on the network feature of the flows, the handling device 210 may generate the detection model.

With the detection model, the handling device 210 may analyze the flow based on the detection model in operation 911. For example, the handling device 210 may count the alerts in each flow during the unit time, and compare the number of the counted alerts with a reference number.

In operation 913, the handling device 210 determines whether a network attack candidate is detected. For example, if the number of the alerts in the flow during the unit time is equal to or greater than the reference value, the handling device 210 may determine that the network attack candidate is detected in the flow. For example, if the number of the alerts in the flow during the unit time is less than the reference value, the handling device 210 may determine that the network attack candidate is not detected in the flow, or that the network attack is less likely to occur in the flow.

If detecting the network attack candidate, the handling device 210 handles the network attack candidate in operation 915. The handling device 210 may process the flow of the detected network attack candidate according to a multi-level action process or a bucket algorithm. For example, the handling device 210 may perform negative bucket movement on the flow of the detected network attack candidate according to the bucket algorithm, or reduce QoS of the flow of the network attack candidate. If it is impossible to perform the negative bucket movement on the flow of the detected network attack candidate or to reduce the QoS, the handling device 210 may conclusively determine the network attack in the corresponding flow and block the corresponding flow.

If detecting no network attack candidate, the handling device 210 determines whether there is a remaining flow in operation 917. Herein, the remaining flow indicates a flow to which the detection model is not applied during the unit time interval among the flows.

Although not depicted, if detecting no network attack candidate, the handling device 210 may perform positive bucket movement on the flow or increase the QoS of the flow. If the flow is already in the active bucket or obtains the QoS of the highest level or range defined in the system, the handling device 210 may not conduct the bucket movement of the flow and maintain the QoS of the flow.

If detecting the remaining flow, the handling device 210 determines whether a network attack candidate is detected in at least one remaining flow, back in operation 913.

If detecting no remaining flow, the handling device 210 finishes this process. Alternatively, the handling device 210 may repeat operations 911 through 917 during a next e interval until the flow of the network attack is blocked.

Figure 10:
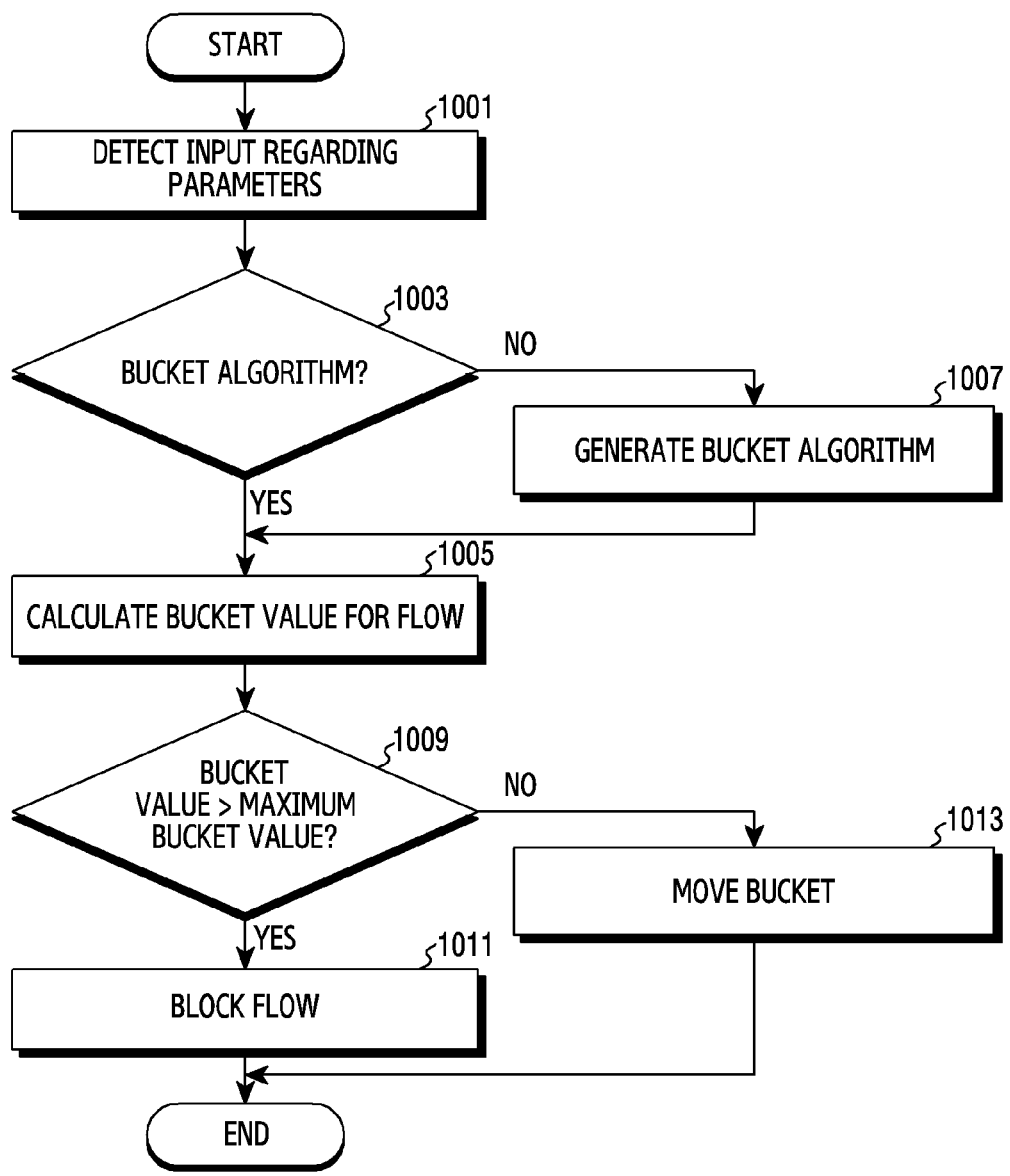
FIG. 10 illustrates a flowchart of multi-level operations for gradually blocking a network attack in an SDN according to various embodiments of the present disclosure.

FIG. 10 illustrates a flowchart of multi-level operations for gradually blocking a network attack in an SDN according to various embodiments of the present disclosure. FIG. 10 illustrates an operating method of the handling device 210.

Referring to FIG. 10, in operation 1001, the handling device 210 detects an input for parameters. The parameters may include a parameter to be used in a bucket algorithm. The parameter to be used in the bucket algorithm may include at least one of the total number of buckets to be used in the bucket algorithm, the total number of suspicious buckets (the maximum number of net negative bucket movements, the number of the suspicious buckets in the bucket structure, the maximum number of consecutive negative bucket movements in the bucket structure, the maximum number of times for reducing flow QoS, and a maximum bucket value defined in the bucket structure), a QoS level or range corresponding to each bucket, a threshold value (i.e., a reference number) for the number of alerts in the flow to determine a network attack candidate, a total bandwidth processed by the switch, a bandwidth corresponding to an active bucket, a bandwidth corresponding to total suspicious buckets, a bandwidth corresponding to each suspicious bucket, a triggering condition of the bucket movement, a triggering condition of bucket maintenance, and a triggering condition of flow blocking.

According to various embodiments of the present disclosure, the parameter to be used in the bucket algorithm may be determined in advance. In this case, operation 1001 may be omitted.

In operation 1003, the handling device 210 determines whether there is the bucket algorithm. That is, the handling device 210 determines whether the system includes the bucket algorithm already generated.

With the bucket algorithm, the handling device 210 calculates a bucket value for a flow in operation 1005. If detecting a network attack candidate in the flow during a unit time interval, the handling device 210 may increase the bucket value of the flow. Otherwise, the handling device 210 may decrease the bucket value of the flow.

Without the bucket algorithm, the handling device 210 generates a bucket algorithm in operation 1007. In other words, the handling device 210 may determine a bucket structure and generate the bucket algorithm using the parameters of operation 901. Next, the handling device 210 calculates the bucket value of the flow according to the bucket algorithm in operation 1005.

In operation 1009, the handling device 210 determines whether the bucket value of the flow exceeds a maximum bucket value.

If the bucket value of the flow exceeds the maximum bucket value, the handling device 210 blocks the flow in operation 1011. That is, if not performing the negative bucket movement of the flow any more, the handling device 210 conclusively determines the network attack in the flow and blocks the flow. Next, the handling device 210 finishes this process. Alternatively, the handling device 210 may repeat operations 1005, 1009, 1011, and 1013 with respect to other flow.

If the bucket value of the flow does not exceed the maximum bucket value, the handling device 210 performs the bucket movement of the flow in operation 1013. The handling device 210 may conduct the bucket movement of the flow to a bucket corresponding to the calculated bucket value. Although not depicted, if the calculated bucket value is smaller than zero, the handling device 210 may reset the bucket value of the flow to zero. That is, if not performing the positive bucket movement of the flow any more, the handling device 210 does not conduct the bucket movement of the flow. Next, the handling device 210 finishes this process. Alternatively, the handling device 210 may repeat operations 1005, 1009, 1011, and 1013 with respect to other flow.

Figure 11:
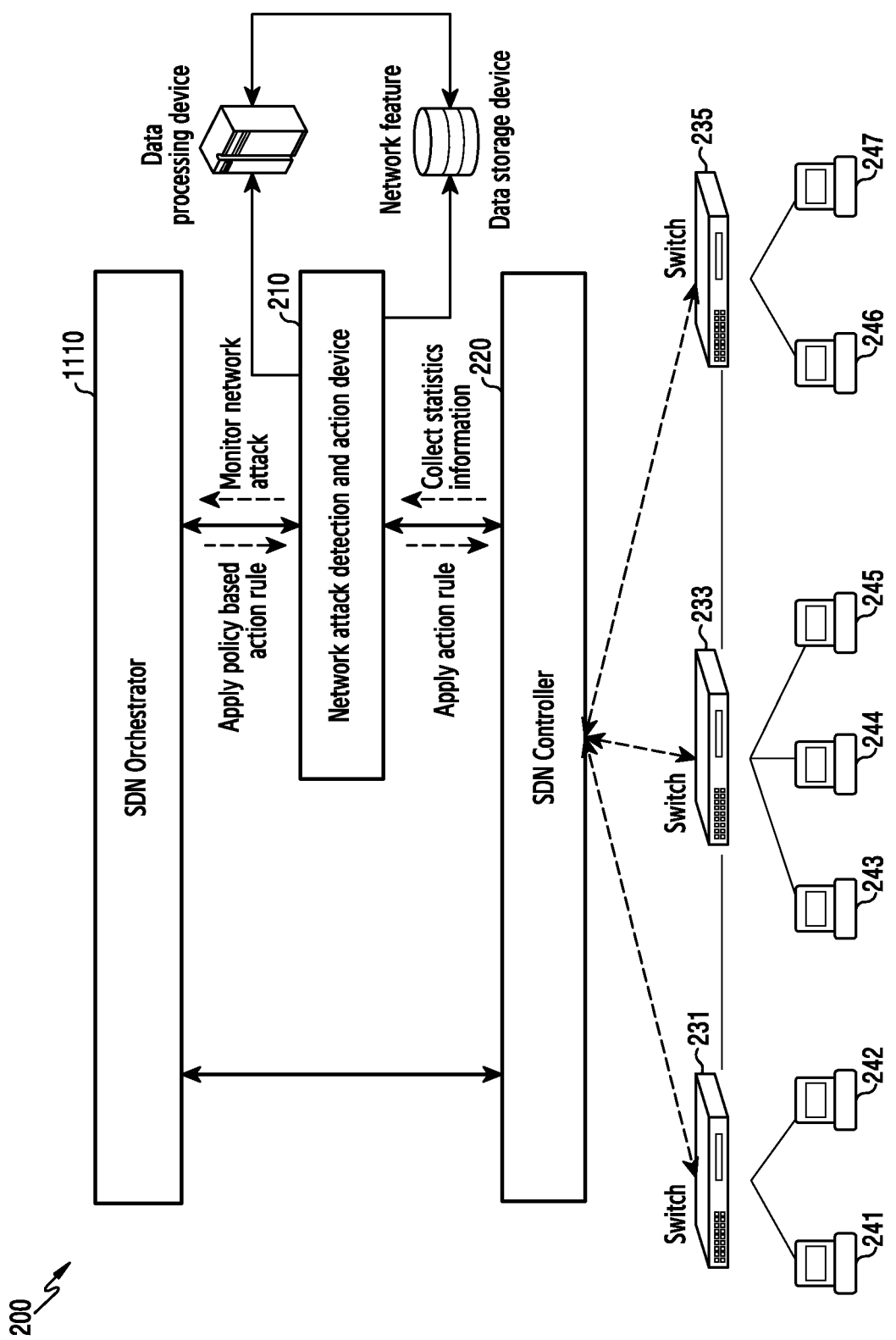
FIG. 11 illustrates a system including an SDN orchestrator in an SDN according to various embodiments of the present disclosure.

FIG. 11 illustrates a system including an SDN orchestrator in an SDN according to various embodiments of the present disclosure.

Referring to FIG. 11, the system 200 may further include an SDN orchestrator 1110. The SDN orchestrator 1110 serves as an upper node of the handling device 210 and the SDN controller 220, and includes the handling device 210 and the SDN controller 220 to control setting/functions of the network entities in the system 200. For example, the SDN orchestrator 1110 may provide an interface for controlling or orchestrating the network entities, receive an input for the control and the orchestration through the interface, or output (e.g., display) control and orchestration results. The SDN orchestrator may transmit a request for controlling and orchestrating the network entities of the system 200 to the handling device 210 and/or the SDN controller 220, and receive a response corresponding to the request from the handling device 210 and/or the SDN controller 220.

According to various embodiments of the present disclosure, the SDN orchestrator 1110 may control and orchestrate to handle a network attack. For example, the SDN orchestrator 1110 may monitor the network attack with respect to the handling device 210, and apply a policy based action rule based on the monitoring. According to the monitoring, the SDN orchestrator 1110 may receive a report notifying the network attack, from the handling device 210, and determine the action rule for the network attack based on the policy. For example, the SDN orchestrator 1110 may determine the policy based action rule instructing to or not to block a flow causing the network attack based on the policy. The SDN orchestrator 1110 may transmit the policy based action rule to the handling device 210, and the handling device 210 may apply the action rule to the SDN orchestrator 1110 according to the received policy based action rule.

In the specific embodiments of the present disclosure, the elements included in the disclosure are expressed in a singular or plural form. However, the singular or plural expression is appropriately selected according to a proposed situation for the convenience of explanation and the present disclosure is not limited to a single element or a plurality of elements. The elements expressed in the plural form may be configured as a single element, and the elements expressed in the singular form may be configured as a plurality of elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for handling a network attack in a software defined network (SDN), comprising:
   determining whether a network attack candidate is detected in the flow during at least one time interval;
   in response to determining, changing the (QoS) of the flow to the first QoS, wherein the at least one time interval precedes the first time interval;
   detecting a first candidate of the network attack in the flow during first time interval;
   in response to detecting the first candidate, changing the QoS of the flow from the first QoS to a second QoS;
   detecting a second candidate of the network attack in the flow of the second QoS during a second time interval following the first time interval; and
   in response to detecting the second candidate, blocking the flow.

2. The method of claim 1, wherein detecting the first candidate comprises:
   receiving statistics information regarding a plurality of flows which comprise the flow;
   based on the statistics information, determining a network feature of the flows;
   generating a detection model to detect the network attack, based on the network feature; and
   detecting the first candidate by applying the detection model to the flow.

3. The method of claim 2, wherein the statistics information comprises parameter values of parameters associated with the flows, and
   the parameters comprise at least one of time elapsed after a flow rule is set, time for erasing the flow rule if matching for the flow rule does not occur, time for erasing the flow rule regardless of the matching for the flow rule, a packet size of the flow rule, and a number of packets matched to the flow rule.

4. The method of claim 3, further comprising:
   detecting an input for selecting at least one of the parameters through a user interface (UI),
   wherein determining the network feature comprises:
   identifying a parameter value of the at least one parameter.

5. The method of claim 1, wherein the detecting the first candidate comprises:
   detecting a plurality of alerts in the flow during the first time interval; and
   if a number of the alerts is equal to or greater than a reference number, determining that the first candidate is detected.

6. The method of claim 5, wherein setting at least one of a duration of the first time interval, a duration of the second time interval, and the reference number is inputted through a user interface (UI).

7. The method of claim 1, wherein the second QoS is lower than the first QoS.

8. The method of claim 1, wherein changing the QoS of the flow comprises:
   if not detecting the first candidate, increasing the QoS of the flow.

9. The method of claim 1, wherein a number of times of changing the QoS of the flow exceeds a threshold number, and
   setting of the threshold number is inputted through a UI.

10. An apparatus for handling a network attack in a software defined network (SDN), comprising:
    a transceiver; and
    at least one processor operably coupled to the transceiver, and configured to:
    determine whether a network attack candidate is detected in a flow during at least one time interval,
    in response to determining, change a quality of service (QoS) of the flow to a first QoS, wherein the at least one time interval precedes a first time interval,
    detect a first candidate of the network attack in the flow during the first time interval,
    in response to detecting the first candidate, change quality of service (QoS) the QoS of the flow from the first QoS to a second QoS,
    detect a second candidate of the network attack in the flow of the second QoS during a second time interval following the first time interval, and
    block the flow in response to detecting the second candidate.

11. The apparatus of claim 10, wherein the at least one processor is further configured to:
    receive statistics information regarding a plurality of flows which comprise the flow,
    determine a network feature of the flows, based on the statistics information,
    generate a detection model to detect the network attack, based on the network feature, and detect the first candidate by applying the detection model to the flow.

12. The apparatus of claim 11, wherein the statistics information comprises parameter values of parameters associated with the flows, and the parameters comprise at least one of time elapsed after a flow rule is set, time for erasing the flow rule if matching for the flow rule does not occur, time for erasing the flow rule regardless of the matching for the flow rule, a packet size of the flow rule, and a number of packets matched to the flow rule.

13. The apparatus of claim 12, further comprising:
an input unit for detecting an input for selecting at least one of the parameters through a user interface (UI),
wherein, to determine the network feature, the least one processor identifies a parameter value of the at least one parameter.

14. The apparatus of claim 10, wherein the at least one processor is further configured to:

detect a plurality of alerts in the flow during the first time interval, and if a number of the alerts is equal to or greater than a reference number, determine that the first candidate is detected.

15. The apparatus of claim 14, wherein setting at least one of a duration of the first time interval, a duration of the second time interval, and the reference number is inputted through a user interface (UI).

16. The apparatus of claim 10, wherein the second QoS is lower than the first QoS.

17. The apparatus of claim 10, wherein, if not detecting the first candidate, the at least one processor increases the QoS of the flow.

18. The apparatus of claim 10, wherein a number of times of changing the QoS of the flow exceeds a threshold number, and setting of the threshold number is inputted through a UI.

* * * * *